(12) United States Patent  
Huster et al.

(10) Patent No.: US 7,537,519 B2  
(45) Date of Patent: May 26, 2009

(54) TRANSFER-ASSISTANCE SYSTEM

(75) Inventors: Jochen Huster, Guetersloh (DE); Ralf Hartmann, Melle (DE); Nobert Diekhans, Guetersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 633 days.

(21) Appl. No.: 11/242,346

(22) Filed: Oct. 3, 2005

(65) Prior Publication Data

US 2006/0094487 A1   May 4, 2006

(30) Foreign Application Priority Data

Oct. 6, 2004   (DE)   ................ 10 2004 048 885  
Oct. 27, 2004  (DE)   ................ 10 2004 052 298

(51) Int. Cl.  
*A01F 12/46* (2006.01)  
*A01D 75/02* (2006.01)  
*A01B 69/00* (2006.01)  
*B65G 67/04* (2006.01)

(52) U.S. Cl. .................. 460/114; 141/231; 701/50; 701/213; 56/10.2 F; 414/397

(58) Field of Classification Search .......... 141/94, 141/231, 250, 311 R; 460/1, 114; 56/10.2 R, 56/10.2 D, 10.2 F; 414/334, 397; 701/23, 701/50, 213, 215

See application file for complete search history.

(56) References Cited

U.S. PATENT DOCUMENTS

| 5,575,316 | A  | * | 11/1996 | Pollklas ................ 141/231 |
| 5,749,783 | A  | * | 5/1998  | Pollklas ................ 460/119 |
| 6,247,510 | B1 | * | 6/2001  | Diekhans et al. ........ 141/231 |
| 6,282,476 | B1 | * | 8/2001  | Hieronymus et al. ....... 701/50 |
| 6,587,772 | B2 | * | 7/2003  | Behnke ................... 701/50 |
| 6,594,979 | B2 | * | 7/2003  | Krone et al. ............ 56/16.6 |
| 6,682,416 | B2 | * | 1/2004  | Behnke et al. ........... 141/231 |
| 6,932,554 | B2 | * | 8/2005  | Isfort et al. ............ 414/397 |
| 6,943,824 | B2 | * | 9/2005  | Alexia et al. ............. 348/89 |
| 6,994,623 | B2 | * | 2/2006  | Isfort et al. ............ 460/114 |
| 7,155,888 | B2 | * | 1/2007  | Diekhans ............... 56/10.2 R |
| 7,277,784 | B2 | * | 10/2007 | Weiss .................... 701/50 |
| 7,324,881 | B2 | * | 1/2008  | Brunnert et al. ........... 701/50 |
| 2004/0173435 | A1 |   | 9/2004  | Vogelgesang |
| 2006/0047418 | A1 | * | 3/2006  | Metzler et al. ............ 701/207 |
| 2006/0178825 | A1 | * | 8/2006  | Eglington et al. .......... 701/211 |

FOREIGN PATENT DOCUMENTS

EP   1 454 520 A1   9/2004

* cited by examiner

*Primary Examiner*—Timothy L Maust  
*Assistant Examiner*—Nicolas A Arnett  
(74) *Attorney, Agent, or Firm*—Michael J. Striker

(57) ABSTRACT

A transfer-assistance system for controlling a crop discharge flow from an agricultural harvesting machine has a transfer device provided in an agricultural working machine for carrying out a crop discharge flow. The system includes a transfer device cover assigned to the transfer device on one end, a transport device to which a crop is transported, a computing unit for determining a relative position and for controlling the crop discharge flow and a driving guidance system.

22 Claims, 3 Drawing Sheets

TRANSFER-ASSISTANCE SYSTEM

BACKGROUND OF THE INVENTION

The present invention relates to a method and a device for controlling a transfer device Self-propelled harvesting machines such as forage harvesters or combine harvesters typically include a transfer device used to transfer the harvested crop to a transport vehicle or a receiving container. In the case of a forage harvester, for example, the crops are transferred continually during the entire harvesting operation using the transfer device to a transport vehicle traveling alongside it. To accomplish this, the transport vehicle must be driven in parallel with the forage harvester or alongside the forage harvester. The driver of the forage harvester must constantly check the position of the transport vehicle relative to the forage harvester to ensure the harvested crop are transferred exactly and without loss. If the position of the forage harvester relative to the transport vehicle changes, the driver of the forage harvester must manually correct the crop transfer by shifting the position of the transfer device or shifting the transfer-device cover located at the end of the transfer device.

Publication EP 1 454 520 A1 discloses a device for controlling the transfer device on an agricultural harvesting machine that shifts the position of the transfer device as a function of the position of a first actuator relative to the position of a second actuator to better transfer the harvested crop to a transport vehicle, the position of the actuators determining the position of the transfer device.

In this manner it is ensured that the positions of the actuators relative to each other are automatically adjusted, so the driver of the forage harvester need not manually adjust the second actuator when the first actuator is shifted to adapt to a changed situation, since the adjustment of the second actuator is carried out automatically by the control. The purpose is to transfer crops in a manner that minimizes driver effort.

The disadvantage of this design of the control of the transfer device is that the driver of the agricultural harvesting machine must still steer the transfer device and coordinate it with the transport vehicle traveling alongside or behind it, to ensure that the harvested crop is transferred largely without loss. This means that, if the driver rotates the crop-transfer device too far, or at an angle that is unfavorable relative to the transport vehicle, harvested crop will continue to be discharged past the transport vehicle and will fall on the ground as a loss.

SUMMARY OF THE INVENTION

The object of the present invention, therefore, is to avoid the disadvantages of the cited related art and provide the driver of the agricultural harvesting machine with a simple, loss-free transfer procedure.

Accordingly, it is an object of the present invention to provide a transfer-assistance system for controlling a crop discharge flow from an agricultural harvesting machine, comprising a transfer device provided in an agricultural working machine and carrying out a crop discharge flow; a transfer device cover assigned to said transfer device on one end; a transport device to which a crop is transported; means for determination of a relative position; means for controlling the crop discharge flow; and a driving guidance system.

It is also another feature of the present invention to provide a means for defining a transfer-assistance system for controlling a crop discharge flow from an agricultural harvesting machine, comprising a transfer device provided in the agricultural harvesting machine and carrying out the crop discharge flow; a transfer device cover assigned to said transfer device on one end; a transport device to which crop is transferred; and means for guiding a point of impact of the crop on said transport device along a defined geometry.

Due to the fact that the transfer-assistance system determines the position of the harvesting machine relative to the transport device and includes crop-discharge flow control and a driving guidance system, the driver of the agricultural harvesing machine is largely relieved of the duty of continually monitoring the transfer procedure. In addition, an exact, loss-free transfer of crop to the transport device is ensured.

Due to the fact that the position of an agricultural working machine relative to at least one transport device is determined, the distance between the harvesting machine and the transport device to be covered to ensure loss-free transfer of crop can be determined exactly.

Due to the fact that the crop-discharge control includes the coordinated control of the position of the transfer device and the position of the transfer-device cover, the change in position of the transfer device and the change in position of the transfer-device cover are coordinated exactly.

By defining the position of the transfer device and the position of the transfer-device cover using different vectors, the exact point of impact of the crop can be determined, ensuring that the point of impact is always located at an optimum point in the transport device.

The point of impact of the crop is guided along a defined geometry in a particularly advantageous manner. The guidance along a defined geometry enables a reliable, loss-free transfer of crop to the transport device. In particular, the effort required by the driver of the agricultural harvesting machine is greatly reduced by this type of point-of-impact control, since the driver need not continually monitor the crop-transfer process and can therefore concentrate on harvesting the crop in the field.

Locating the point of impact in a virtual grid, in particular, ensures that crop is transferred exactly within this grid.

If the harvesting conditions change, e.g., due to the use of different-sized transport devices, the grid can be adapted to these changed conditions at any time by changing the size and position of the virtual grid.

By subdividing the virtual grid into virtual fields, the size of which can be changed, a particularly exact guidance of the point of impact of the crop within the fields in the grid is achieved.

This exact guidance of the point of impact within the virtual grid and the virtual windows is achieved in a simple manner by pressing a switch on a generally known control lever for the transfer device, so that a certain virtual window is controlled directly as a function of the pressing of the switch or by the number of times the switch is pressed. The same principle of controllability can be applied to the entire virtual grid.

A particularly even filling of the transport device is achieved by locating the point of impact on a straight line or a curved path.

In addition, an even filling of the transport device is ensured by the fact that the transport device organizes the shifting the point of impact.

The effort required by the driver of the harvesting machine is greatly reduced in particular when the transfer device is rotated automatically. As an alternative, the driver of the harvesting machine always has the option of intervening manually in the control of the transfer device to make corrections.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
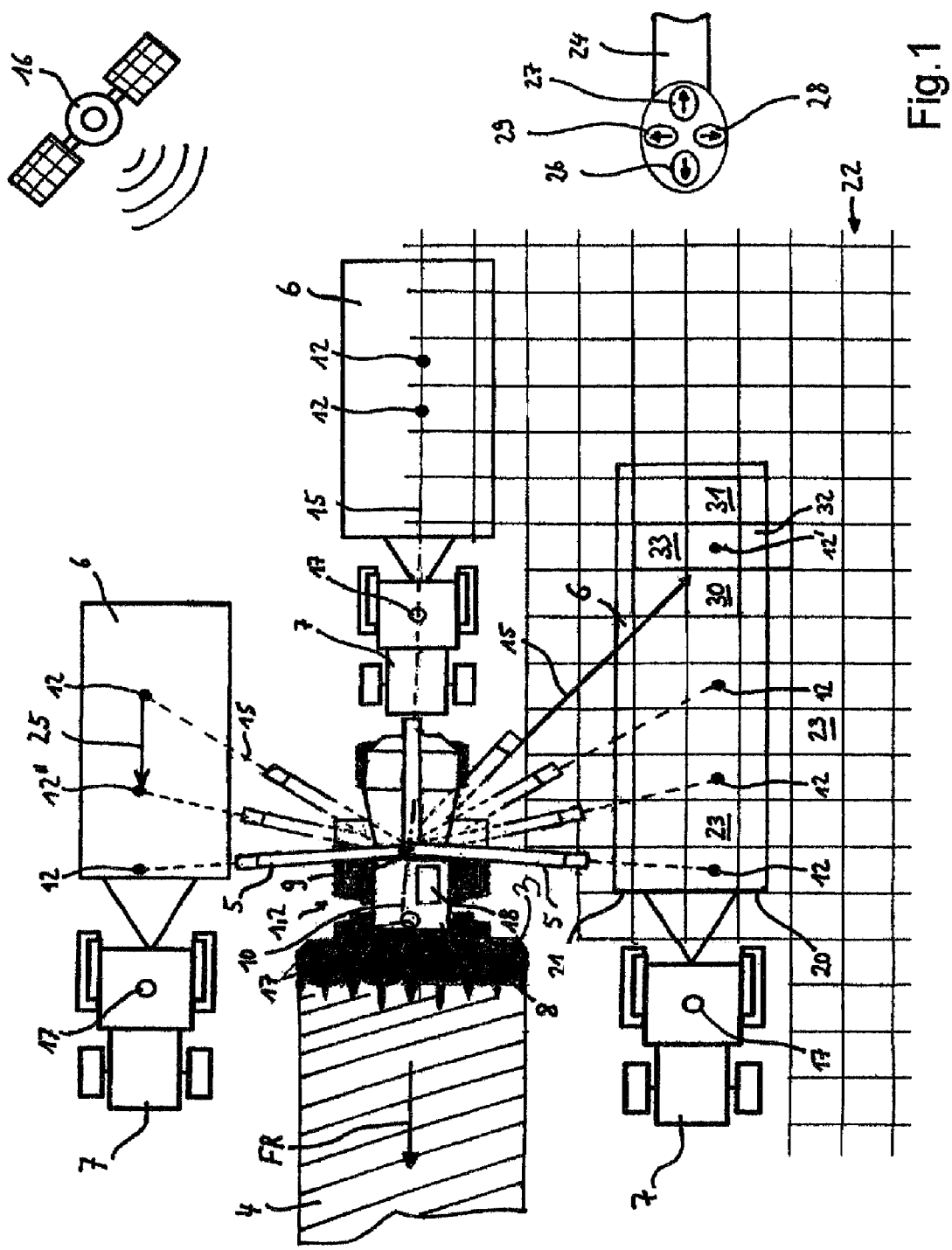
FIG. 1: shows a top view of a forage harvester with different tractors driving alongside and behind it, with an adapted transport device

A top view of an agricultural harvesting machine 2 configured as a self-propelled forage harvester 1 is shown in FIG. 1. A front attachment 3, with a corn header 3' in front of it, is assigned to the front of forage harvester 1, front attachment 3 cutting and collecting crop 4 and conveying it to a chopping device (not shown).

Chopped crop 4 is then transferred via a transfer device 5 to a transport device 6. Transport device 6 is adapted to a tractor 7 which, in the ideal case, drives alongside forage harvester 1 in parallel alongside or directly behind tractor 7. In a manner known per se, transfer device 5 located behind driver's cab 8 is capable of being rotated around a vertical axis of rotation 9 and, to adjust the height, it is capable of being displaced along a horizontal axis 10. In addition, the distance of the crop discharge flow can be controlled by a transfer-device cover 11 capable of being be raised and lowered. If transfer-device cover 11 is pivoted upward, the harvested crop are thrown further. If transfer-device cover 11 is pivoted downward, the harvested crop is thrown less further.

During the harvesting operation, the driver of an agricultural harvesting machine 2 faces the problem of harvesting crop 4 evenly in the direction of travel of moving harvesting machine 2 without leaving any crops standing in the field, while ensuring a reliable, loss-free transfer of harvested crop 4 to transport device 6. With regard for transferring crop 4 to transport device 6, the driver of harvesting machine 2 must continually monitor the transfer range to exactly determine point of impact 12 of the crop flow in transport device 6. This is an additional duty that the driver has to perform, in addition to following tracks exactly during the harvesting procedure.

According to the present invention, the transfer-assistance system relieves the driver of this continual monitoring duty by the fact that the transfer-assistance system includes determination of relative position, control of crop discharge flow, and a driving guidance system. In this manner, point of impact 12 of crop discharge flow is directed toward transport device 6 in an optimum manner, so the driver can better concentrate on the harvesting process.

The determination of the position of harvesting machine 2 designed as forage harvester 1 relative to the position of transport device 6 pulled by tractor 7 is carried out using a generally known global positioning system (GPS). Using GPS satellites 16, identification, position and time signals are transmitted at identical time intervals, the signals being received by a GPS antenna 17 located on tractor 7 and by a GPS antenna 17 located on forage harvester 1. Based on the receipt and transmission of the GPS signals, a computing unit determines the position of tractor 7 and transport device 6 adapted to tractor 7 relative to forage harvester 1. The GPS data and the data on the current position of transfer device 5 and transfer-device cover 11 are transferred to a module (not shown), in which point of impact 12 is calculated.

In a general mathematical model, optimum and desired point of impact 12 within transport device 6 is calculated with reference to the determination of relative position. The result of this calculation is integrated in the control of transfer-device cover 11 and transfer device 5, via which the direction of crop discharge flow 15 and, therefore, calculated point of impact 12 of harvested crop 4 within transport device 6 is controlled.

The effort required by the driver of forage harvester 1 is greatly reduced during the harvesting operation in particular by the fact that point of impact 12 is guided along a defined geometry. This defined geometry can be converted to the shape of a virtual grid, for example, that encloses a subsection of or the entire area of forage harvester 1.

The position and size of virtual grid 22 is changeable and, advantageously, can be placed at the height of the upper edge of side panel 21 of transport device 6. As a result, it can be ensured that crop discharge flow 15 is not directed too low and therefore impact the side panel 21 of transport device 6 and fall to the ground as a loss.

In an advantageous manner, virtual grid 22 is subdivided into a plurality of virtual fields 23. Due to the controllability of virtual grid 22 and virtual fields 23, the driver of forage harvester 1 is capable of directing crop discharge flow 15 exactly within this grid 22 and fields 23.

Using a multifunction handle 24 located inside driver's cab 8, the driver of forage harvester 1 can change the position of transfer device 5 and transfer-device cover 11 and, therefore, the direction of crop discharge flow 15. As a result, virtual grid 22 and virtual fields 23 located therein are controllable. The control is carried out as a function of the operation of multifunction handle 24, i.e., as a function of pressing one of the operating elements 26, 27, 28, 29 on multifunction handle 24. The possible directions of motion of transfer device 5 indicated by operating elements 26, 27, 28, 29 on multifunction handle 24 shall be matched to the control of a certain virtual field 23. In the basic exemplary embodiment, this means point of impact 12' remains unchanged in this neutral position.

When operating element 26 is pressed, point of impact 12' is moved in direction of travel FR by one virtual field 23, to virtual field 30. When operating element 27 is pressed, point of impact 12' is moved—starting at the neutral position described above—opposite to direction of travel FR by one virtual field 23, to virtual field 31. If the driver of forage harvester 1 presses operating element 28, point of impact 12' moves—starting from the neutral position—by one virtual field 23 on the left-hand side, to virtual field 32 and, if operating element 29 is pressed, it moves by one virtual field 23 on the right-hand side, to virtual field 33. It is within the scope of the present invention to cover a plurality of virtual fields 23 in succession based on the number of times corresponding operating element 26, 27, 28 or 29 is pressed, by way of which the driver of forage harvester 1 achieves a rapid and exact displacement of transfer device 5 and an exact filling of transport vehicle 6. During the harvesting procedure, point of impact 12' is shifted only within panels 20, 21 of transport device 6, thereby ensuring an optimum, loss-free procedure of transferring harvested crop 4 into transport device 6.

The control of point of impact 12 described above and the associated transfer of crops can be applied accordingly when transport vehicle 6 is in any position relative to agricultural harvesting machine 2.

Instead of using and shifting point of impact 12 within a virtual grid 22 or virtual fields 23, it is feasible to guide the shifting of point of impact 12 to point of impact 12" along a straight line. Point of impact 12 is moved to point of impact 12" by pressing operating element 26. The distance travelled 25 along the straight line is determined by how long operating element 26 is pressed. The statements made above also apply for the remaining operating elements 27, 28, 29.

Due to the fact that the size of virtual fields 23 can be changed, the driver of the forage harvester can determine if he wants to have rapid repositioning by using large fields 23 or slow and exact repositioning by using small fields 23.

Overall, the transfer of harvested crop 2 is oriented to the position and size of virtual grid 22 and to the size and position of fields 23, so that the range of rotation of transfer device 5 is determined by the virtual grid and virtual fields 23.

Figure 2:
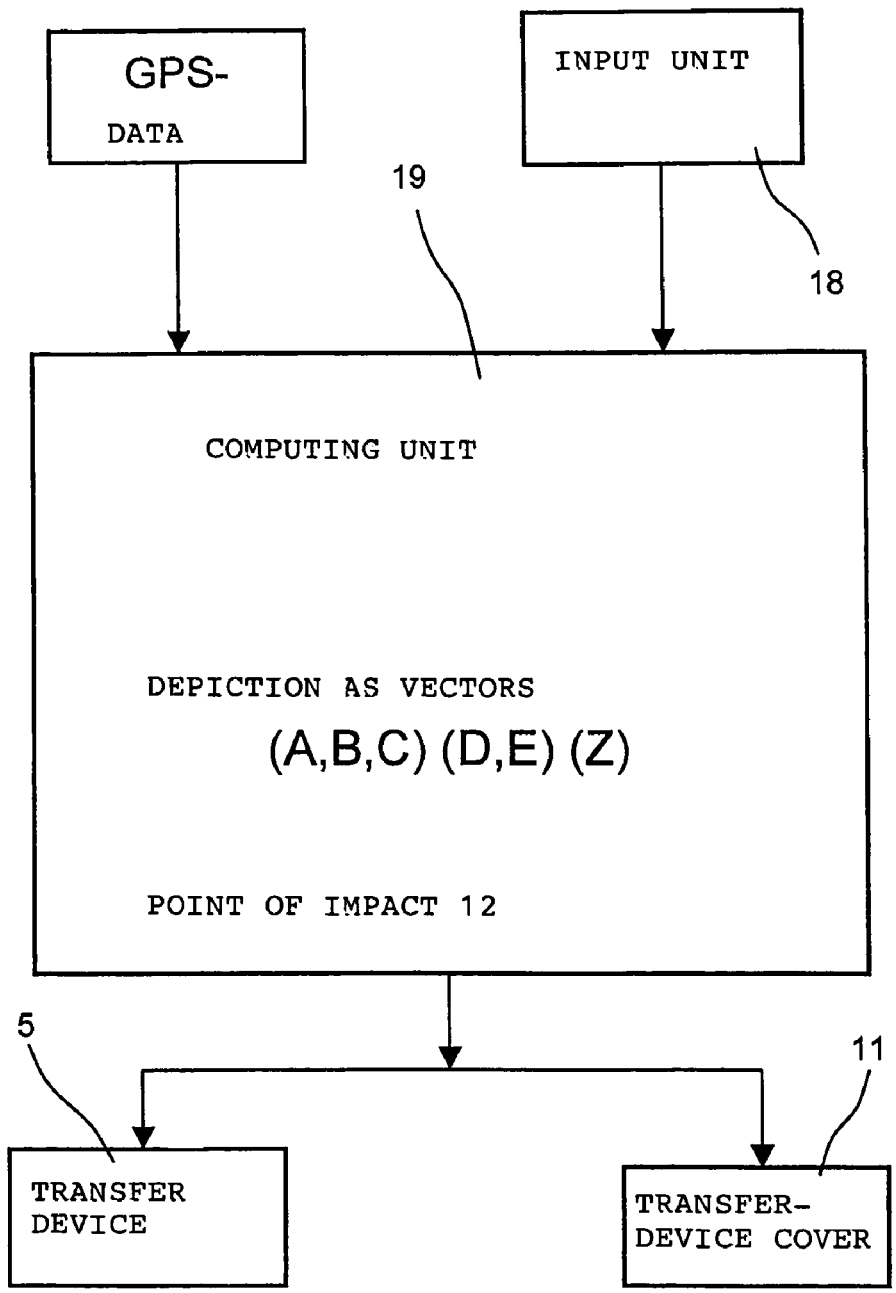
FIG. 2: shows a flow chart of the transfer-assistance system according to the present invention, according to FIG. 1

A flow chart depicting the transfer-assistance system is shown in FIG. 2. As described above with reference to FIG. 1, the GPS signals indicating the position of forage harvester 1 relative to tractor 7 and transport device 6 adapted thereto are transmitted to a computing unit 19, which can be designed as a module.

The driver of harvesting machine 2 can enter limiting values in an input unit 18 that influence a loss-free transfer of harvested crop to transport device 6. For example, the roof of the cab of harvesting machine 2 or the height of panels 20, 21 of transport device 6 are essential factors that influence the transfer of harvested crop. For example, the size and arrangement of the cab roof on a self-propelled forage harvester 1 limit the ability of transfer device 5 to rotate in the front region of forage harvester 1, since, if transfer device 5 would rotate too far in the direction of travel FR, transfer device 5 would hit the cab roof. On the other hand, the height of panels 20, 21 of transport device 6 determines the minimum height at which the crop discharge flow must be directed to transport device 6. It should be noted that the limiting values stated here are not fixed; they can be expanded as necessary.

The limiting values entered are subsequently transmitted to computing unit 19 and are used—in addition to the GPS signals—to calculate point of impact 12. Point of impact 12 is determined as a function of the received GPS and limiting value signals with reference to a mathematical model that results from vectors A, B, C, D, E—to be described below with reference to FIG. 3—by adding vectors A, B, C or vectors D and E.

Based on the result of this calculation, a signal to be sent to transfer device 5 and transfer-device cover 11 is generated.

Transfer device 5 and transfer-device cover 11 are adjusted as a function of this generated signal, so that the position of transfer device 5 and the position of transfer-device cover 5 define the point of impact 12 of harvested crop 4 within transport device 6, and a transfer of harvested crop that is loss-free and minimizes the effort required of the driver of harvesting machine 2 is ensured.

Figure 3:
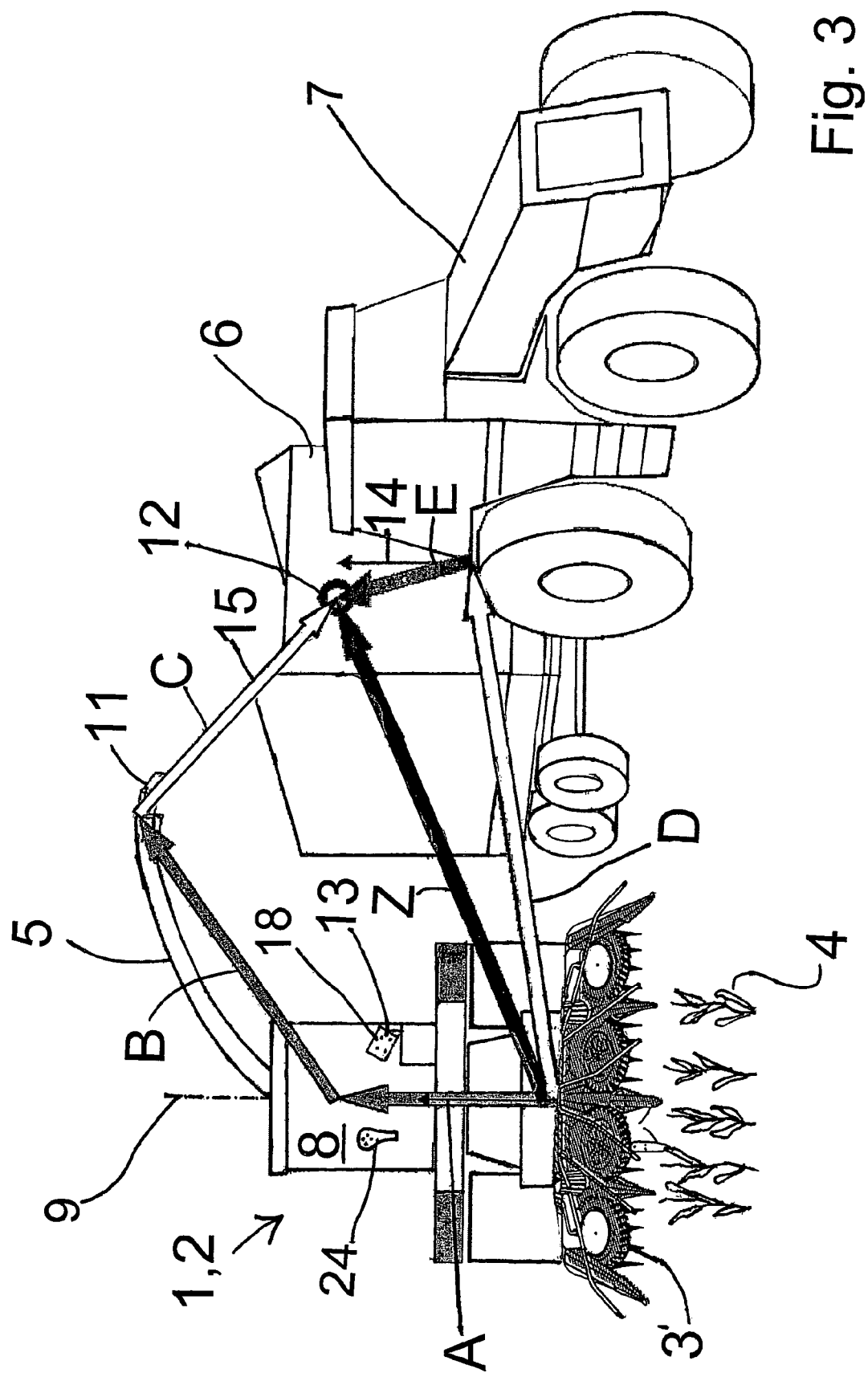
FIG. 3: shows a view of an agricultural harvesting machine designed as a forage harvester with a tractor driving alongside it, according to FIG. 1

Shown in FIG. 3 to describe the present invention in greater detail is a forage harvester 1 and a tractor 7 with adapted transport device 6 being driven alongside forage harvester 1.

The determination of the position of forage harvester 1 relative to transport device 6—as a guide variable for determining point of impact 12 of crop 4 within transport device 6—is carried out using a GPS satellite navigation system known per se to pinpoint the positions of forage harvester 1 and transport device 6, and the position of a target point vector (Z) of forage harvester 1 relative to a reference point, point of impact 12, on transport unit 6.

Control of crop discharge is carried out in a manner known per se by displacing transfer device 5 and displacing transfer-device cover 11; transfer device 5 can be moved along horizontal axis 10, e.g., using a flange joint (not shown), and along the vertical axis 9 using a piston cylinder unit (not shown). The distance crop 4 is thrown can be regulated by displacing transfer-device cover 11. The upward or downward motion of transfer-device cover 11 is coupled to the horizontal and vertical motion of transfer device 5.

This means that, if transfer device 5 lowers, transfer-device cover 5 is displaced upward by a certain extent, so that transfer point 12 is always located on a straight distance travelled 25.

The driving guidance system can display the optimum position for the current transfer procedure relative to transport vehicle 6 to the driver of forage harvester 1 via an optical display unit 13 inside driver's cab 8. The display of the current relative position is important during critical travels around curves, since a loss-free transfer of crop 4 is not entirely possible in these areas, due to the fact that rotation of transfer device 5 is limited at the front by driver's cab 8.

To transfer harvested crop 4 to transport device 6 in an optimum, interference-free manner, the position of transfer device 5 and the position of transfer-device cover 11 are defined in a mathematical model using different vectors A, B, C, D, E.

The definition of vectors A, B, C, D, E serves to determine a target point vector Z. Target point vector Z establishes an optimum point of impact 12 of the harvested crop in the space of transport device 6.

Target point vector Z can be determined in different ways. For example, a vertical vector A, a transfer device vector B and a crop discharge flow vector C are added together, with vertical vector A extending parallel to vertical axis 14 of transport device 6. Transfer device vector B is determined by the horizontal and vertical position of transfer device 5, and crop discharge flow vector C is determined by the throwing direction of harvested crop 4 being discharged from transfer device 5. The sum of these three vector quantities A, B, C yields target point vector Z. By determining target point vector Z, point of impact 12 of crop discharge flow 15 in the space of transport device 6 is defined.

As an alternative to calculating point of impact 12 of crop discharge flow 15 using vectors A, B, C, point of impact 15 can also be determined via relative position vector D and loading point vector E. Relative position vector D describes the position of forage harvester 1 relative to transport device 6. Loading point vector E describes the point of impact of crops 4 within transport device 6. The sum of vectors D and E yields target point vector Z, so that point of impact 12 can be defined.

Since the mass of harvested crop is distributed differently in transport device 6 during the harvesting operation, and the quantity of harvested crop has different heights, it is advantageous to make point of impact 12 adjustable. As a result, the driver of harvesting machine 2 can control the crop discharge flow exactly by moving point of impact 12 and thereby fill the transport vehicle exactly.

Since the position of harvesting machine 2 relative to transport device 6 changes regularly—due, e.g., to inaccurate steering or different traveling speeds of harvesting machine 2 and tractor 7—it is advantageous to design target point vector Z to be variable. This means that a change in vector quantity A, B, C, D or E does not affect the accuracy of the transfer of harvested crop, since the change in vector quantities is integrated directly in the calculation of target point vector Z and, therefore, point of impact 12 of crop discharge flow 15 is re-determined and updated, so that the harvested crop continue to be transferred without loss.

In an advantageous manner, point of impact 12 of crop discharge flow 15 is located on a straight line, as shown in FIG. 1. Due to the location of point of impact 12 on a straight line—which, in the ideal case, is located in the center of transport device 6—crop 4 is transferred to transport device 6 in a particularly even manner, so that the heaped cone of transferred crop 5 can expand evenly in transport device 6.

It is also within the scope of the present invention to locate point of impact 12 on a curved path (not shown), so that crop discharge flow 15 travels, e.g., in the longitudional direction of transport device 6 from interior panel 20 of transport device 6 to opposite interior panel 21 of transport device 6. As a result, a particularly exact filling of transport device 6 is achieved, since crop discharge flow 15 covers the entire width and length of transport device 6.

Finally, it is possible for transport device 6 or tractor 7 pulling transport device 6 to organize the shifting of point of impact 12. With this exemplary embodiment, the position of transfer device 5 is held constant, and the position of transport device 6 varies as a function of the current fill level. To support the position adjustment, a driving guidance system displays to the tractor driver the position of harvesting machine 2 relative to transport device 6, so the driver can best orient transport device 6 relative to transfer device 5 by making a simple steering motion.

As described above, the driver of forage harvester 1 has the option of controlling transfer device 5 manually or to perform automatic control, which runs through a defined loop, for example.

It will be understood that each of the elements described above, or two or more together, may also find a useful application in other types of constructions differing from the types described above.

While the invention has been illustrated and described as embodied in an transfer-assistance system, it is not intended to be limited to the details shown, since various modifications and structural changes may be made without departing in any way from the spirit of the present invention.

Without further analysis, the foregoing will reveal fully revela the gist of the present invention that others can, by applying current knowledge, readily adapt it for various applications without omitting features that, from the standpoint of prior art, fairly constitute essential characteristics of the generic or specific aspects of the invention. What is claimed as new and desired to be protected by Letters Patent is set forth in the appended claims.

The invention claimed is:

1. A transfer-assistance system for controlling a crop discharge flow from an agricultural harvesting machine, comprising:
   a transfer device provided in an agricultural working machine for carrying out a crop discharge flow;
   a transfer device cover assigned to said transfer device on one end;
   a transport device to which a crop is transported means for determining positions of the transfer device and the transfer device cover;
   means for determining a point of impact on the transport device derived using a mathematical model defined by vector values based on positions of the transfer device and transfer device cover;
   means for controlling the crop discharge flow in accordance with the determined point of impact; and
   a driving guidance system.

2. A transfer-assistance system as defined in claim 1, wherein said means for determination of a point of impact is operative for determining the relative position between the agricultural harvesting machine and the transport device.

3. A transfer-assistance system as defined in claim 1, wherein said means for controlling a crop discharge flow include means for a coordinated control of a position of the transfer device and a position of the transfer device cover.

4. A transfer-assistance system as defined in claim 3, wherein said means for coordinated control is configured so as to define the position of the transfer device and the position of the transfer device cover in a mathematical model using vectors.

5. A transfer-assistance system as defined in claim 1, wherein said means for defining the point of impact is operative for creating the target point vector by performing vectorial addition of a vertical vector, a transfer device vector, and a crop discharge vector.

6. A transfer-assistance system as defined in claim 5, wherein said means for defining the point of impact is configured so as to create the target point vector by performing vectorial addition of a relative position vector and a loading point vector.

7. A transfer-assistance system as defined claim 1; and further comprising means for varying a target point vector defining the point of impact.

8. A transfer-assistance system as defined in claim 1, wherein said driving guidance system is configured so as to display a position of the agricultural harvesting machine relative to the transport device.

9. A transfer-assistance system as defined in claim 1; and further comprising means for rotating the transfer device in a manner selected from the group consisting of automatically rotating and manually rotating.

10. A transfer-assistance system as defined in claim 1; and further comprising means for receiving and processing signals for determining a position of the agricultural harvesting machine relative to the transport device via a GPS system; means for receiving and processing signals for determining a crop discharge flow control via a position of the transfer device and the transfer device cover; and means for displaying the signals to a driver of the agricultural harvesting machine in the driving guidance system.

11. A transfer-assistance system for controlling a crop discharge flow from an agricultural harvesting machine, comprising:
    a transfer device provided in the agricultural harvesting machine for carrying out the crop discharge flow;
    a transfer device cover assigned to said transfer device on one end;
    a transport device to which crop is transferred; means for determining positions of the transfer device and the transfer device cover; and
    means for determining a point of impact of the crop on said transport device along a defined geometry derived using a mathematical model defined by vector values based on positions of the transfer device and transfer device cover.

12. A transfer assistance system as defined in claim 11; and further comprising means for defining the point of impact of the crop discharge flow within a virtual grid.

13. A transfer-assistance system as defined in claim 12, wherein said means for defining the point of impact is formed so that at least one parameter of the virtual grid selected from the group consisting of a position of the virtual grid, a size of the virtual grid, and both, is changeable.

14. A transfer-assistance system as defined in claim 12, wherein said means for defining the point of impact is formed so that the virtual grid is subdivided into a plurality of virtual fields.

15. A transfer-assistance system as defined in claim 14, wherein said means for defining the point of impact is formed so that a size of the virtual fields of the virtual grid is changeable.

16. A transfer-assistance system as defined in claim 14; and further comprising means for controlling the virtual grid and the virtual fields.

17. A transfer-assistance system as defined in claim in claim 14; and further comprising means for controlling the point of impact within the virtual grid and the virtual fields and including a pressable switch.

18. A transfer-assistance system as defined in claim 12; and further comprising means for rotating the transfer device as a function of a parameter selected from the group consisting of a position of the virtual grid, a size of the virtual grid, and both.

19. A transfer-assistance system as defined in claim 18, wherein said means for rotating said transfer device is configured so that a range of rotation of the transfer device is determined by a virtual field.

20. A transfer-assistance system as defined in claim 11; and further comprising means for adjusting a point of impact of the crop on the transport device.

21. A transfer-assistance system as defined in claim 11, wherein the point of impact of the crop discharge flow of the transport device is located in a location selected from the group consisting of on a straight line and on a curved path.

22. A transfer-assistance system as defined in claim 11; and further comprising means for organizing by the transport device a displacement of the point of impact of the crop discharge flow on the transport device.

* * * * *